Patented June 12, 1928.

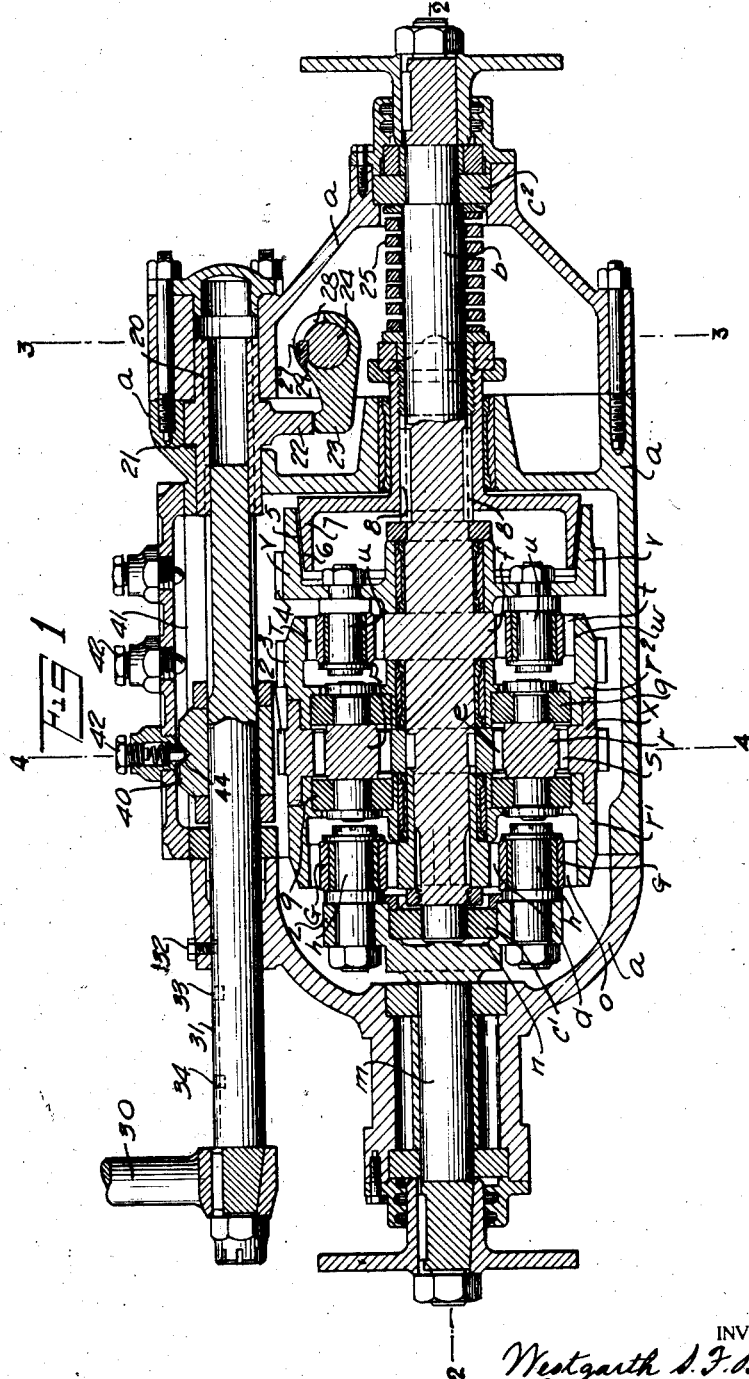

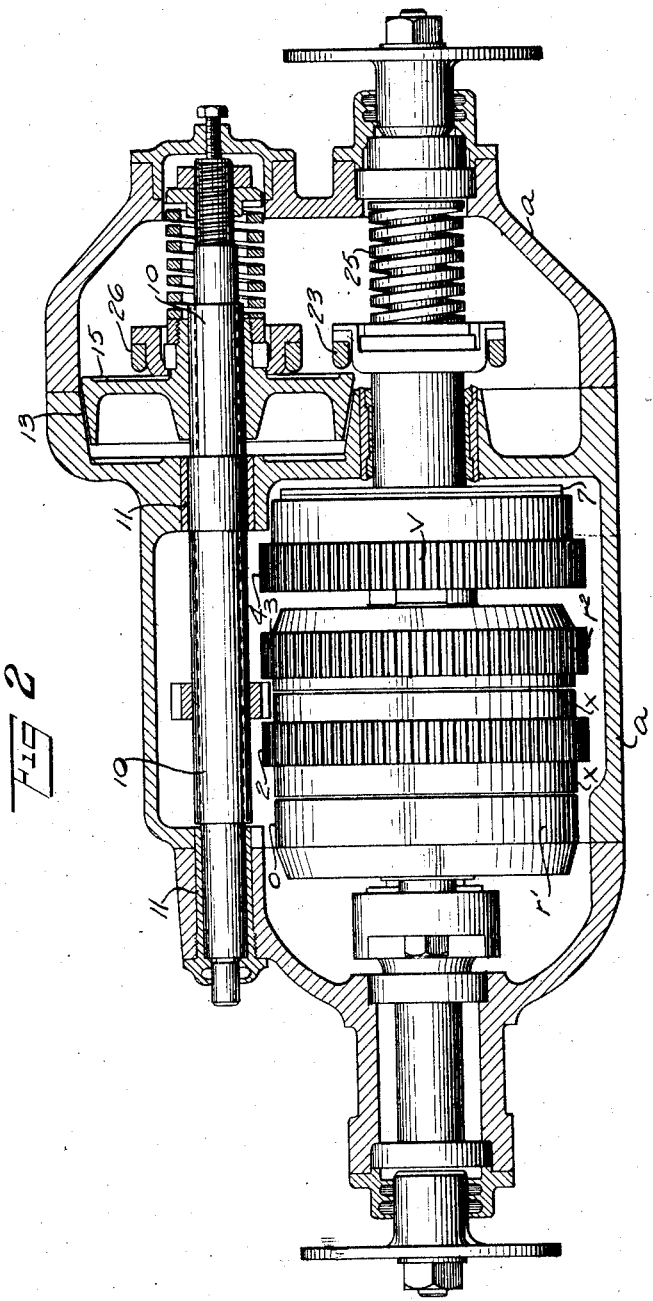

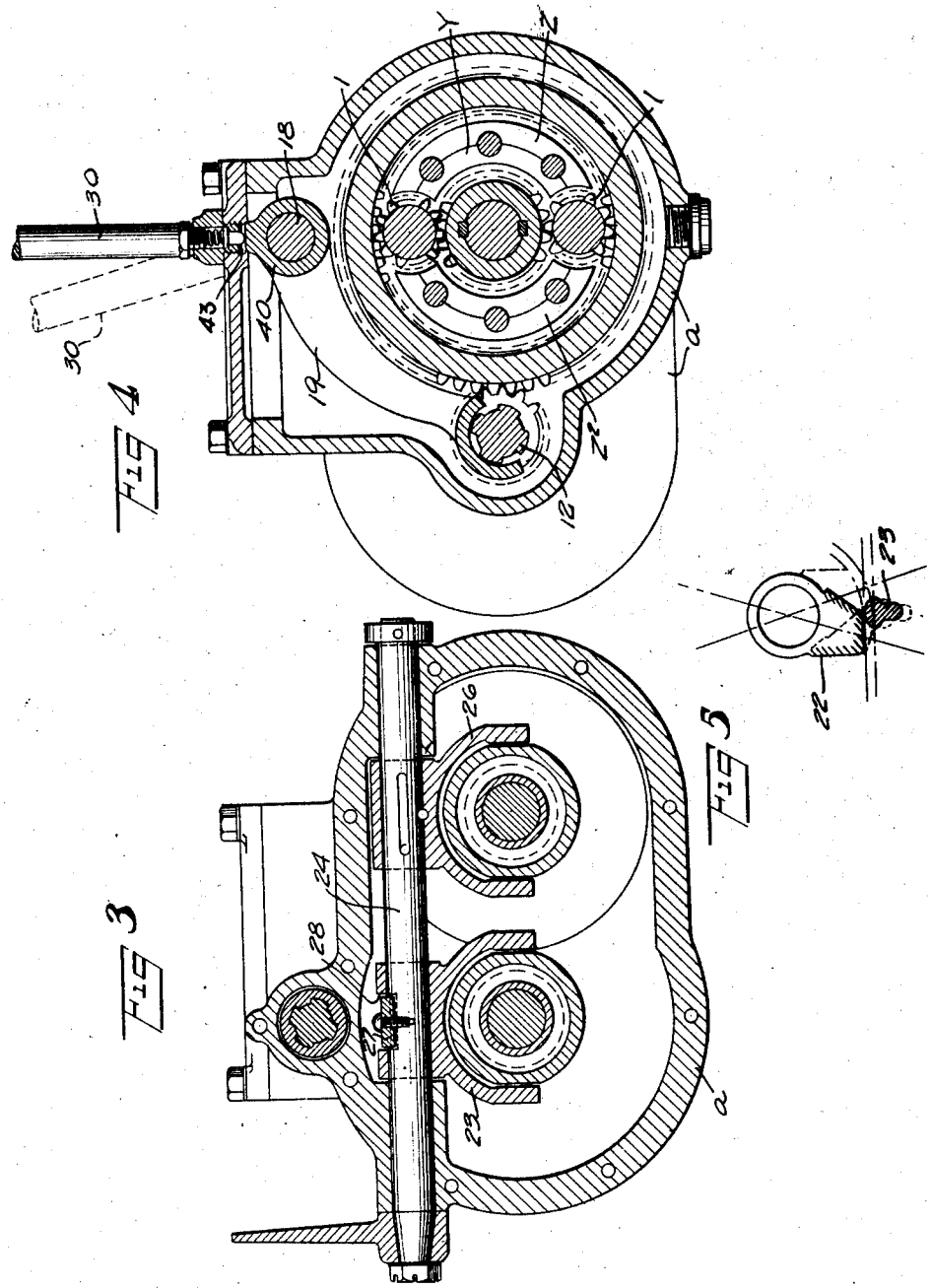

1,672,868

UNITED STATES PATENT OFFICE.

WESTGARTH STANHOPE FORSTER BROWN AND JOSEPH MAINA, OF LONDON, ENGLAND.

VARIABLE-SPEED GEARING.

Application filed December 29, 1923, Serial No. 683,316, and in Great Britain January 3, 1923.

This invention relates to epicyclic variable speed gearing of the type comprising sun and planet pinions, the latter meshing with geared wheels adapted to be locked for the purpose of obtaining different speeds.

In an epicyclic variable speed gear made in accordance with this invention, an epicyclic gear of this type is provided, characterized by a single planetary cage on which are mounted one or more gears one or more of which are formed in one with the planetary cage and one or more being adapted to rotate freely thereon, and further characterized in that one or more geared wheels or groups of geared wheels are provided with external teeth.

Further, in an epicyclic gear made in accordance with this invention, we provide a reduction gear obtained through the medium of one or more single epicyclic groups of gear (acting within a single planetary cage), each group being constituted by a plurality of satellite pinions or sets of satellite pinions, meshing with a plurality of sun pinions mounted solid on a common shaft and therefore having the same angular speed.

Further, in an epicyclic gear made in accordance with this invention we provide a reverse member mounted to rotate freely on the shaft and means for retarding said reverse member or for preventing the said reverse member from rotating in order to obtain the reverse in combination with means for causing the said reverse member to rotate with the shaft or with the planetary cage or any of the geared wheels by clutching it thereto or otherwise in order to obtain the direct drive.

And further, in an epicyclic gear made in accordance with this invention we provide a controlling device comprising means for selectively engaging a lay shaft with the reverse member or with the geared wheel or one of the geared wheels, means for braking the lay shaft to a stationary part of the gear to prevent the rotation of either the reverse member or one of the geared wheels, means whereby the depression of a clutch pedal or the like will disengage both the brake controlling the rotation of the lay shaft and the clutch engaging the reverse member, means whereby the axial sliding or other movement of a gear lever or the like will engage the lay shaft with either the reverse member or one of the geared wheels, means whereby radial or other movement of said gear lever will allow the reverse member to be engaged with its clutch, and means whereby said radial or other movement of said gear lever can only take place when the pinion on the lay shaft is disengaged that is to say, when the gear is in a neutral position.

A particular arrangement of epicyclic gearing, constructed according to this invention, comprises, generally speaking, a plurality of pinions secured solid to the driving shaft, each pinion engaging a group of satellites. single or compound, each group of satellites meshing with a geared wheel; the geared wheels may be independent or two or more may be rigidly interconnected; one or more geared wheel or wheels is or are provided with external teeth adapted to engage the pinion of a controlling shaft.

The planetary cage is preferably provided with one or more cylindrical flanges, the outer peripheries of which form bearing surfaces which engage the extremities of the internal teeth of the free geared wheel or wheels. The cylindrical flange or flanges cover the satellite pinions and are provided with slots through which extend the parts of the satellite pinions that engage the geared wheel or wheels.

Referring to the drawings filed herewith, which illustrate as an example one particular construction of epicyclic gear made according to this invention:—

Fig. 1 is a sectional elevation of one form of gear made in accordance with this invention for use as a car gear;

Fig. 2 is a sectional plan on line 2—2 of Fig. 1, and

Fig. 3 is a transverse section on line 3—3 of Fig. 1;

Fig. 4 is a transverse section on line 4—4 of Fig. 1;

Fig. 5 is a diagrammatic elevation of the cam operating the direct speed.

In the arrangement of epicyclic gear shown in the figures, enclosed in the casing $a$, $b$ is the driving shaft, mounted on bearings $c^1$, $c^2$. Integral with or solidly mounted on the shaft $b$ are three pinions $d$, $e$ and $f$, each one of which is adapted to engage one group of satellites. The pinion $d$ engages the group of satellites $g$, $g$, mounted to rotate freely on pins $h$, $h$, integral with or carried by a flanged element $l$ formed at the end of the driven shaft $m$, and recessed at $n$ to receive the bearings $c^1$ as shown. The satellites $g$, $g$ engage an internal gear $o$. The pinion $e$ engages the group of satellites $p$, $p$ mounted to rotate freely on bearings $q$, $q$, carried by the planetary cage made of two parts $r^1$ and $r^2$, secured together. The satellites $p$, $p$ engage an internal gear $s$. The pinion $f$ engages the group of satellites $t$, $t$, mounted to rotate freely on pins $u$, $u$, integral with or carried by a reverse element $v$, freely mounted on the shaft $b$. The satellites $t$, $t$ engage an internal gear crown $w$.

The two gears $o$ and $w$ are integral with or secured to the two parts $r^1$, $r^2$, of the planetary cage respectively, while the gear $s$ is integral with or secured to a ring member $x$ carried by the planetary cage $r^1$, $r^2$ and adapted to revolve freely thereon.

The two parts of the planetary cage $r^1$ and $r^2$ are bolted together and kept in true alignment by a spigot $y$ (shown in detail in Fig. 4), machined with two segmental projections $z^1$, $z^2$, acting as distance pieces between the two parts $r^1$ and $r^2$ to provide an annular space in which the ring element $x$ carrying the gear $s$ operates. $z^1$ and $z^2$ are recessed or partly removed at 1, 1, so as to leave a space where the satellites $p$, $p$ operate. The bearings $q$, $q$ of the satellites $p$, $p$ are mounted in housings machined out of the parts $r^1$, $r^2$ of the planetary cage. The two parts of the planetary cage, $r^1$, $r^2$, are each provided with bearings or bushes and the cage is adapted to rotate freely on the shaft $b$. The ring member $x$, the part $r^2$ of the planetary cage, and the reverse member $v$, are each provided with external teeth 2, 3, 4 respectively, the pitch circle of which have preferably the same diameter.

The reverse member $v$ is mounted to rotate freely on the shaft $b$; this reverse member carries the external teeth 4 on its periphery, and an internal cone surface 5 forming the driven component of a clutch 6.

7 is the driving member of the clutch 6 and is adapted to slide on the shaft $b$ the rotation of which is transmitted by keys 8, 8.

The controlling gear comprises a lay shaft 10 mounted in bearings 11; a pinion 12 adapted to slide along and rotate with the shaft 10; and a clutch brake 13 the external cone member 15 of which is adapted to slide on the shaft 10 and rotate therewith.

18 is a selector rod adapted by means of a fork 19 to slide the pinion 12 into engagement with either of the teeth 2, 3, 4 as desired, or to maintain it in neutral position between any of the said teeth 2, 3 or 4. The fork 19 is mounted between two collars and is provided with a boss projection 40 engaging a channelled groove 41 and adapted to stop in positions determined by spring locking pins 42 engaging notches 43 or chambers 44.

One end of the selector rod 18 is splined and adapted to slide in a broached sleeve 20 held against axial movement by and adapted to rotate in a recess 21 in the casing $a$. 22 is a cam formed on the sleeve 20 adapted to operate a bell crank lever 23 mounted loosely on a shaft 24, said bell crank lever being adapted to withdraw the driving member 7 of the clutch 6 against the operation of a spring 25. Keyed to the shaft 24 is a crank 26 adapted to slide the cone member 15 on the shaft 10 to disengage the clutch brake 13. The shaft 24 is adapted be to rotated by the usual clutch pedal of the car or the like, and is provided with a key 27 disposed within a slot 28 in the bell crank lever 23.

When the clutch pedal is depressed the key 27 engages a face 29 on the bell crank lever and actuates it to disengage the clutch 6.

Attached to one end of the selector rod 18 is an operating lever 30. On the selector rod 18 a longitudinal groove 31 is cut to act as a guide for the axial movement of the rod through engagement with a screw 32. 33 and 34 are circumferential grooves branching from the longitudinal groove 31 which allow rotary movement of the rod 18 when the pinion is in a disengaged position between the teeth 2, 3 or 4.

In operation movement is transmitted to the driven shaft $m$ by controlling the crown $o$ which can be maintained stationary, or can be caused to rotate in the same direction as and at a slower speed than the shaft $b$, or in the reverse direction to the shaft $b$, in order to obtain the first, intermediate and reverse speeds respectively. The direct drive is obtained by locking the reverse member $v$ to the shaft $b$ by means of the clutch 6.

To stop the crown $o$ in order to obtain the first speed, the pinion 12 (Fig. 2) is moved to engage the teeth of the crown 3 on the planetary cage, and the shaft 10 is prevented form rotating by engaging the clutch brake 13.

To cause the crown $o$ to rotate in the same direction as the shaft $b$, and thereby obtain the intermediate speed, the ring $x$ is prevented from rotating by bringing the pinion 12 into engagement with the crown 2 on the ring $x$. This causes the planetary cage to rotate. To cause the crown $o$ to travel in the reverse direction to the shaft $b$ and thereby obtain a reverse speed, the pinion 12 is brought into engagement with the external teeth 4 of the reverse member $v$.

To cause the clutch 6 to engage, in order to obtain a direct drive, the selector rod 18 is moved axially so that the pinion 12 is in neutral position and it is then moved radially to rotate the sleeve 20 to move the cam 22 into a position which allows the spring 25 to act on the member 7.

Depression of the clutch pedal will in all cases disconnect the drive from the shaft m as it always disconnects the clutch brake 13, and, when the gear is in direct drive, it also causes the key 27 to engage the surface 29 thereby actuating the bell crank lever 23 to disengage the clutch 6.

When the gear is not in direct drive the clutch 6 is held disengaged by the cam 22 on the sleeve 20.

The slot 28 in the bell crank lever 23 allows the clutch pedal to be raised without engaging the clutch 6 when it is maintained in the disengaged position by the cam 22, the key 27 in this case sliding freely in said slot 28.

The clutch 6 cannot be engaged while the pinion 12 is in engagement with any of the crown wheels as its movements are controlled by the screw 32 engaging the grooves 31, 33 or 34.

Other intermediate speeds can be obtained by allowing the clutch brake 13 to slip.

The advantage of the arrangement of the clutches 6 and 13 is that there is a high relative speed between the two components of the clutches before engagement, which features we have found to give improved operation of the clutch. Arrangement is made to take the thrust from the clutch members. The gear casing is constructed to contain oil, and oil retaining devices may be used when necessary.

In gears as above, we obtain one reverse gear and three forward gears, one of which is direct drive. Where preferable we may employ more than two trains of epicyclic gearing to obtain a further number of gear ratios.

Having now particularly described and ascertained the nature of our said invention and in what manner the same is to be performed, we declare that what we claim is:—

1. In variable speed epicyclic gearing of the type described, a driving shaft, a shaft to be driven, a plurality of central pinions having the same angular speed fast on said driving shaft, a planetary cage enclosing said pinions, internal and external spur gears on said cage, satellite pinions situated and operating between said central pinions and internal spur gears, a flanged disc for reverse driving mounted to rotate freely on said driving shaft and carrying a group of said satellite pinions, an external spur gear on said flanged disc, a clutch adapted to engage said disc, a second flanged disc on the shaft to be driven carrying one group of said satellite pinions, a lay shaft, means for selectively engaging the lay shaft with one of said external spur gears for reduced speed and reverse drives, a brake for locking said lay shaft to a stationary part of the gearing to prevent the rotation of either the first-mentioned flanged disc or of the planetary cage, means for disengaging the brake and clutch, a gear lever, means whereby the axial sliding of said lever will engage the lay shaft with either of the external spur gears, means whereby radial movement of said lever will allow said first-mentioned flanged disc to be engaged by the clutch, and means whereby such radial movement of said lever can only take place when the lay shaft is not in engagement with any of the external spur gears.

2. In variable speed epicyclic gearing of the type described, a driving shaft, a shaft to be driven, a plurality of central pinions having the same angular speed fast on said driving shaft, a planetary cage enclosing said pinions, internal and external spur gears on said cage, a flanged disc freely mounted on the driving shaft, a plurality of groups of satellite pinions, one of said groups being pivoted on the driven member, one on said flanged disc and the other groups to said cage, all of said groups being situated and operating between said central pinions and internal spur gears, means for preventing said flanged disc from rotating when it is desired to rotate the driven shaft in a reverse direction, and means for causing said disc to rotate with the shaft when it is desired to obtain a direct drive.

3. In variable speed epicyclic gearing of the type described, a driving shaft, a shaft to be driven, a plurality of central pinions having the same angular speed fast on said driving shaft, a planetary cage enclosing said pinions, internal and external spur gears on said cage, a flanged disc freely mounted on the driving shaft, a plurality of groups of satellite pinions, one of said groups being pivoted on the driven member, one on said flanged disc and the other groups to said cage, all of said groups being situated and operating between said central pinions and internal spur gears, means for preventing said disc from rotating when it is desired to rotate the driven shaft in a reverse direction, and means for causing said disc to rotate with the shaft when it is desired to obtain a direct drive, the speed of the driven member being varied by varying the speed of the planetary cage carrying the gear which engages that group of satellites pivoted on said driven member.

4. In variable speed epicyclic gearing of the type described, a driving shaft, a shaft to be driven, a plurality of central pinions having the same angular speed fast on said driving shaft, a planetary cage enclosing said pinions, internal and external spur gears on said cage, a flanged disc freely mounted on the driving shaft, a plurality of groups of satellite pinions, one of said groups being pivoted on the driven member, one on said flanged disc and the other groups on said cage, all of said groups being situated and operating between said central pinions and internal spur gears, means for preventing said disc from rotating when it is desired to rotate the driven shaft in a reverse direction, and means for causing said disc to rotate with the shaft when it is desired to obtain a direct drive, the speed of the planetary cage carrying the gear which engages that group of satellites pivoted on said driven member, and the variation in speed of said cage, being obtained by the braking of any one of said external spur gears.

5. In variable speed epicyclic gearing of the type described, a driving shaft, a shaft to be driven, a plurality of central pinions having the same angular speed fast on said driving shaft, a planetary cage, internal spur gears on said cage, a ring member carried by and adapted to revolve on said cage, an internal spur gear on said ring member, a flanged disc mounted to rotate freely on said driving shaft, a clutch adapted to engage said flanged disc to lock it to the driving shaft, external teeth on said cage, ring member and flanged disc respectively, satellite pinions carried by said cage, driven member and flanged disc respectively and situated and operating between said central pinions and internal spur gears, a lay shaft, means for selectively engaging the lay shaft with the external teeth of either the cage, ring, or flanged disc, a brake for preventing the rotation of said lay shaft to hold either the planetary cage, the ring member or the flanged disc stationary, and means for simultaneously disengaging both the brake and clutch.

6. In variable speed epicyclic gearing of the type described, a driving shaft, a shaft to be driven, a plurality of central pinions having the same angular speed fast on said driving shaft, a planetary cage, cylindrical flanges on said cage, internal spur gears on said cage, a ring member carried by said flanges and adapted to revolve on said cage, an internal spur gear on said ring member, a flanged disc mounted to rotate freely on said driving shaft, a clutch adapted to engage said flanged disc to lock it to the driving shaft, external teeth on said cage, ring member and flanged disc respectively, satellite pinions carried by said cage, driven member and flanged disc respectively and situated and operating between said central pinions and internal spur gears, a lay shaft, means for selectively engaging the lay shaft with the external teeth of either the cage, ring, or flanged disc, a brake for preventing the rotation of said lay shaft to hold either the planetary cage, the ring member or the flanged disc stationary, and means for simultaneously disengaging both the brake and clutch.

7. In variable speed epicyclic gearing of the type described, a driving shaft, a shaft to be driven, a plurality of central pinions having the same angular speed fast on said driving shaft, a planetary cage, internal spur gears on said cage, a ring member carried by and adapted to revolve on said cage, an internal spur gear on said ring member, a flanged disc mounted to rotate freely on said driving shaft, a clutch adapted to engage said flanged disc to lock it to the driving shaft, external teeth on said cage, ring member, and flanged disc respectively, satellite pinions carried by said cage, driven member, and flanged disc respectively and situated and operating between said central pinions and internal spur gears, a lay shaft, means for selectively engaging the lay shaft with the external teeth of either the cage, ring or flanged disc, a brake for braking said lay shaft to a stationary part of the apparatus to prevent the rotation of either the cage, the ring member or the flanged disc, means for simultaneously disengaging both the brake and clutch, and means for automatically preventing the engagement of the clutch while the lay shaft is in engagement with any of said external teeth.

8. An arrangement of variable speed epicyclic gear of the type described comprising a driving shaft, a driven shaft, several pinions carried by said driving shaft, a group of satellites for each pinion adapted to mesh therewith, pins supporting said satellites, a planetary cage, a plurality of gear elements carried by said cage with the internal teeth of which said satellites continuously mesh, a clutch adapted to rotate with said driving shaft, a flanged disc mounted freely on the driving shaft but adapted to be connected with said clutch and supporting the first group of satellites, and a second flanged disc integral with the driven shaft supporting the pins of the last group of satellites, the pins of satellites of the intermediate groups being supported by the planetary cage.

9. An arrangement of variable speed epicyclic gear of the type described comprising a driving shaft, a shaft to be driven, several pinions carried by said driving shaft, a group of satellites for each pinion adapted to mesh therewith, pins supporting said satellites, a planetary cage constituted by two crowns solidly coupled together but separated by an intervening annular space, a ring member disposed in said space and bearing freely on peripheral flanges formed on said coupled crowns, a plurality of gear elements carried by said cage and ring member with the internal teeth of which said satellites continuously mesh, a clutch adapted to rotate with said driving shaft, a flanged disc mounted freely on the driving shaft but adapted to be connected with said clutch and supporting the first group of said satellites, and a second flanged disc integral with the driven shaft supporting the pins of the last group of said satellites, the pins of the satellites of the intermediate groups being supported by the planetary cage.

10. An arrangement of variable speed epicyclic gear of the type described comprising a driving shaft, a driven shaft, several pinions carried by said driving shaft, a group of satellites for each pinion adapted to mesh therewith, pins supporting said satellites, a planetary cage comprising a plurality of parts solidly coupled together and separated by an annular space, an independent ring member located in said space, gear elements carried by said cage and ring member with the internal teeth of which said satellites continuously mesh, a clutch adapted to rotate with said driving shaft, a flanged disc mounted freely on the main shaft but adapted to be connected with said clutch and supporting the first group of satellites, and a second flanged disc integral with the driven shaft supporting the pins of the last group of satellites, the pins of the satellites of the intermediate groups being supported by the planetary cage, external teeth on the ring member, planetary cage and first mentioned flanged disc, a sliding pinion adapted to engage said teeth, and a device for controlling such engagement.

11. In variable speed epicyclic gearing of the type described, a driving shaft, a shaft to be driven, a plurality of central pinions having the same angular speed fixed to one of said shafts, a planetary cage enclosing said pinions, concentric internal and external spur gears on said cage, a disc freely mounted on the shaft to which the said central pinions are fixed, a plurality of satellite pinions, one of said pinions being carried by the other shaft, one by said disc and another by said cage, and the pinions all meshing permanently with said central pinions and said internal spur gears, means for preventing said disc from rotating when it is desired to obtain a reverse drive, and means for causing said disc to rotate with its shaft when it is desired to obtain a direct drive.

In witness whereof we have hereunto set our hands.

WESTGARTH STANHOPE FORSTER BROWN.
JOSEPH MAINA.